Oct. 27, 1953   F. BELMONT   2,657,003
BAGGING MACHINE
Filed Aug. 10, 1950   5 Sheets-Sheet 1

INVENTOR.
FRANK BELMONT
BY
Lyon & Lyon
ATTORNEYS

Oct. 27, 1953        F. BELMONT           2,657,003
                     BAGGING MACHINE
Filed Aug. 10, 1950                    5 Sheets-Sheet 2
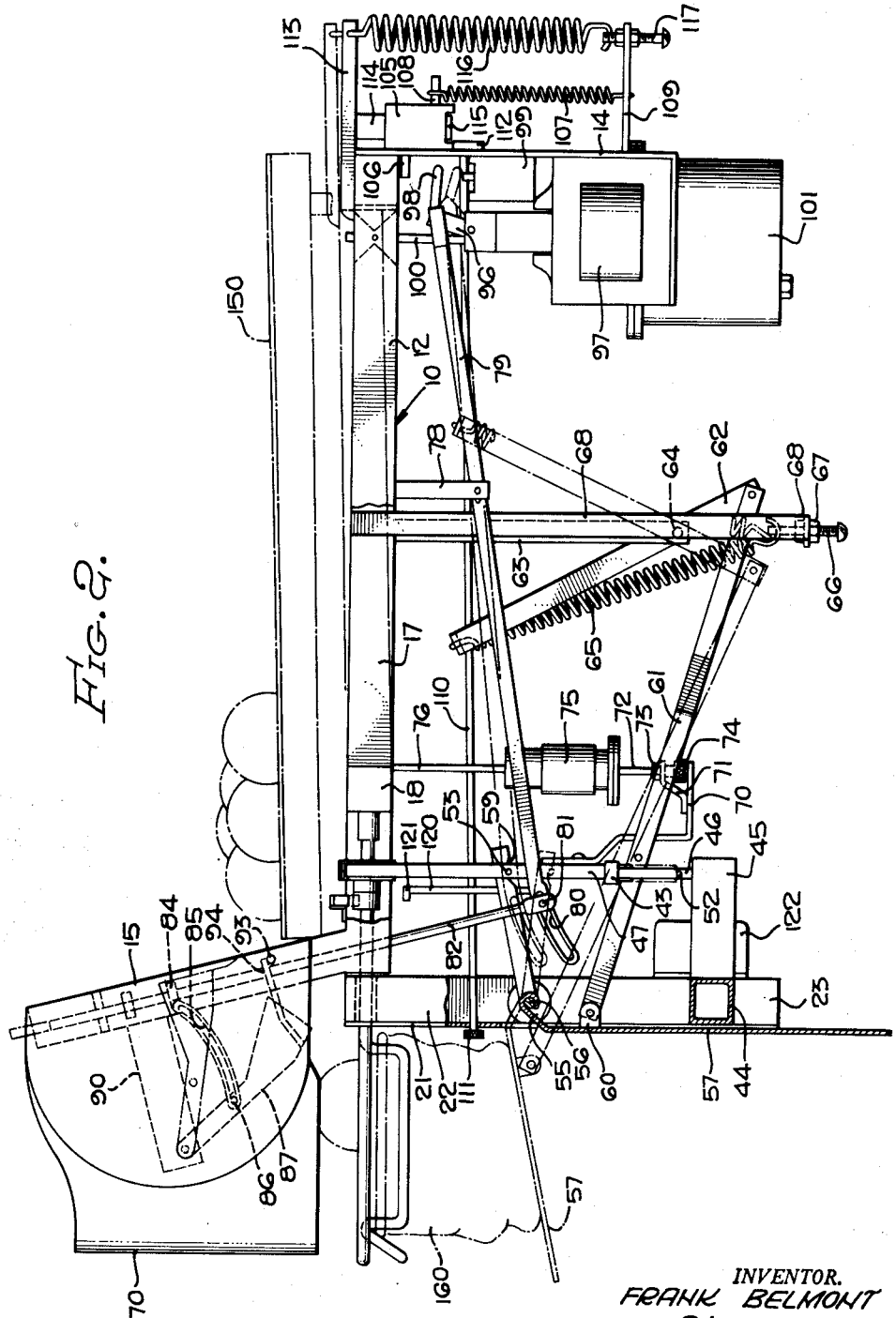
Fig. 2.
INVENTOR.
FRANK BELMONT
BY
ATTORNEYS

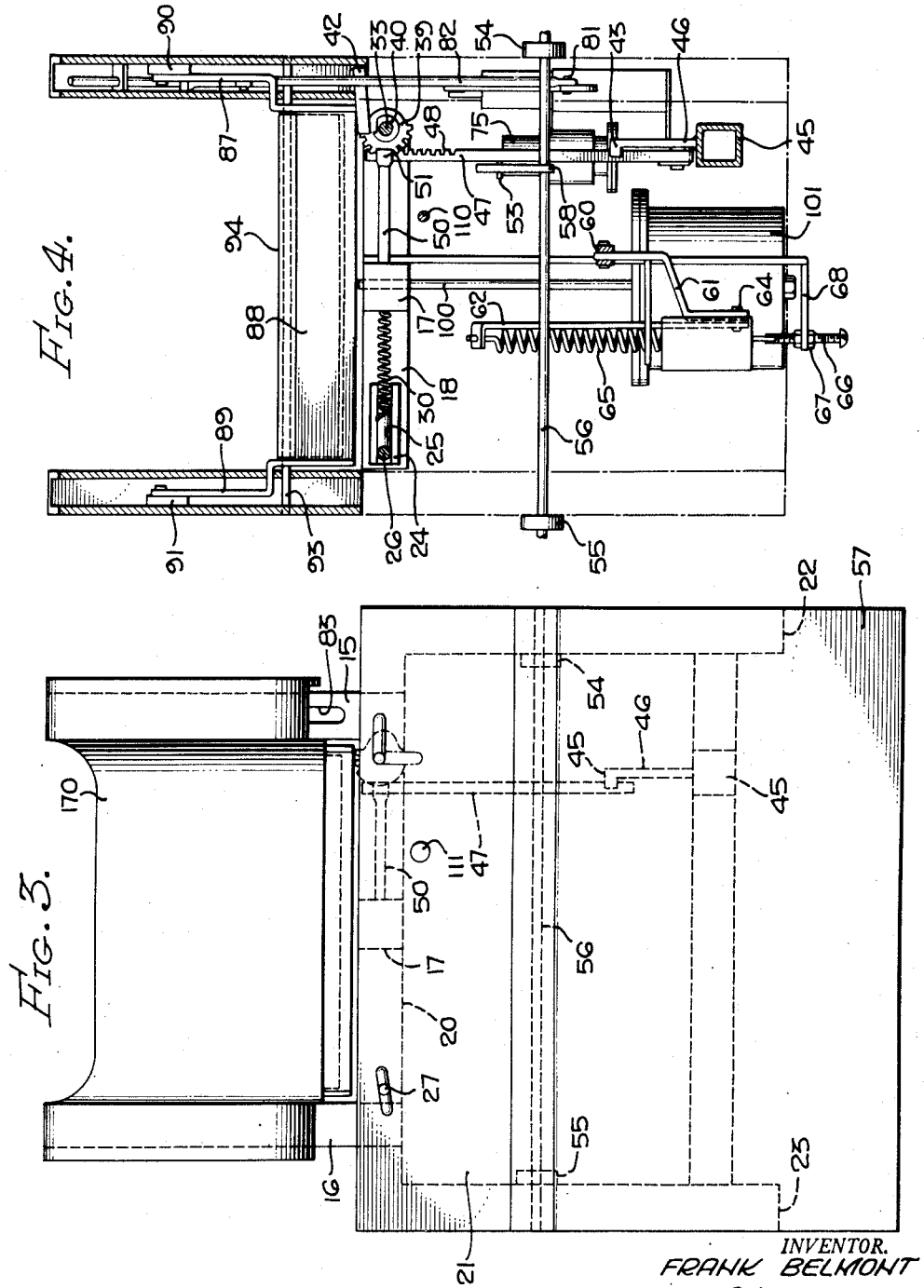

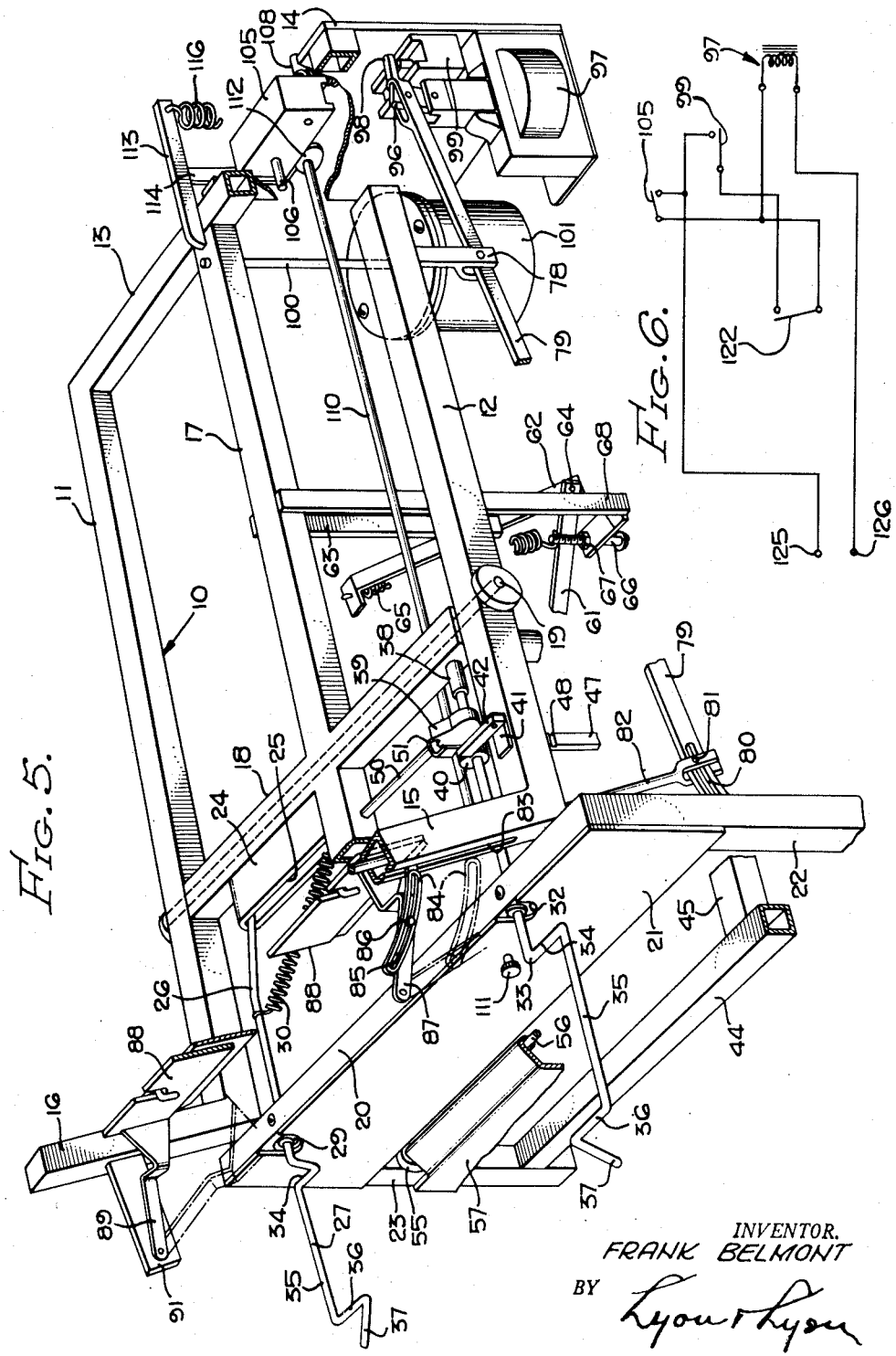

Oct. 27, 1953  F. BELMONT  2,657,003
BAGGING MACHINE
Filed Aug. 10, 1950  5 Sheets-Sheet 5
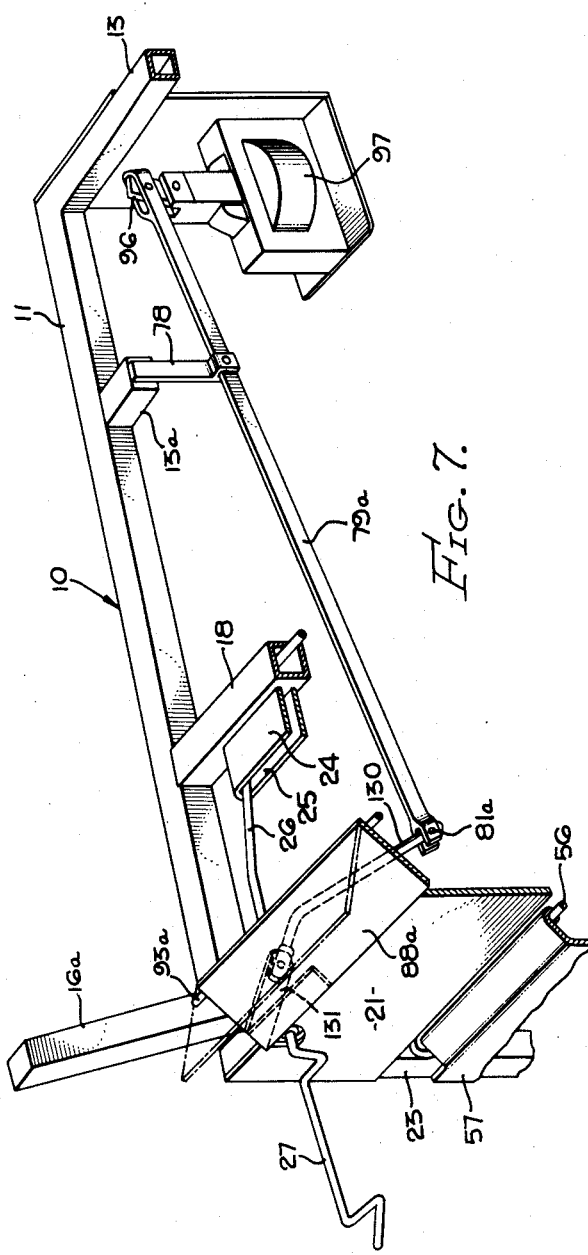
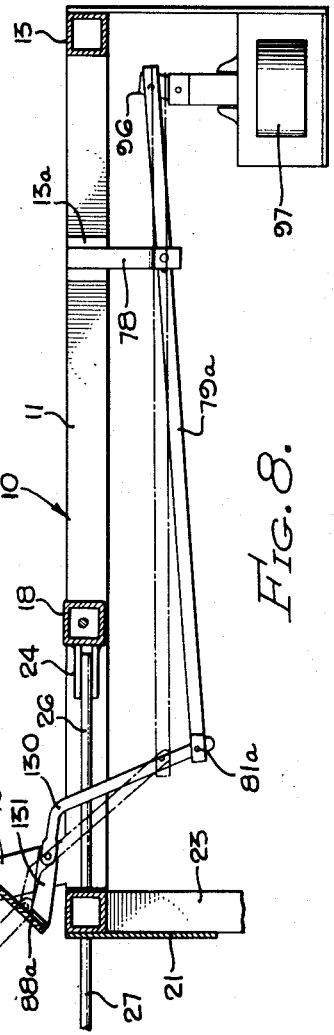
INVENTOR.
FRANK BELMONT
BY Lyon+Lyon
ATTORNEYS Patented Oct. 27, 1953

2,657,003

UNITED STATES PATENT OFFICE 2,657,003

BAGGING MACHINE

Frank Belmont, Anaheim, Calif.

Application August 10, 1950, Serial No. 178,589

12 Claims. (Cl. 249—58)

This invention relates to a bagging machine and particularly to an improved type bagging machine for the purpose of packaging fruit and preferably citrus fruit.

The machine is adapted for use in a packing house having a conveyor belt or chute upon which the fruit passes, and comprises a tilt beam the outer end of which supports the bag being filled and is so arranged that upon the bag acquiring the desired weight of contents, the bag is automatically released, while a gate closes the chute to prevent overfilling or spilling of produce onto the floor.

It is one object of this invention to provide a filling machine of the type described, in which means is provided for automatically releasing elastic closure bags so that the filled bag is removed from the machine automatically.

It is another object of this invention to provide means for supporting the bag while being filled to prevent bruising of the fruit, which means is however rendered inoperative during the latter part of the filling operation to insure complete filling of the bags.

It is another object of this invention to provide an improved bag filling mechanism having gate action which functions to prevent excess fruit from spilling into the bags.

It is another object of the present invention to provide a bag filling machine which can be used with either elastic closure fruit bags or draw string type fruit bags.

It is a further object of this invention to provide a bag filling machine of the type described which is simple and economical to construct.

These and other objects and advantages of the present invention will be apparent from the annexed specification in which:

Figure 2 is a side view partly in section of the device shown in Figure 1.

Figure 3 is a front view of the device shown in Figure 1.

Figure 4 is a section taken along the line 4—4 of Figure 1.

Figure 5 is an enlarged fragmentary elevation with parts removed for clarity of description.

Figure 6 is a schematic wiring diagram.

Figure 7 is a fragmentary perspective elevation of an alternative embodiment of the gate closing mechanism.

Figure 8 is a vertical section of the device shown in Figure 7.

Figure 1:
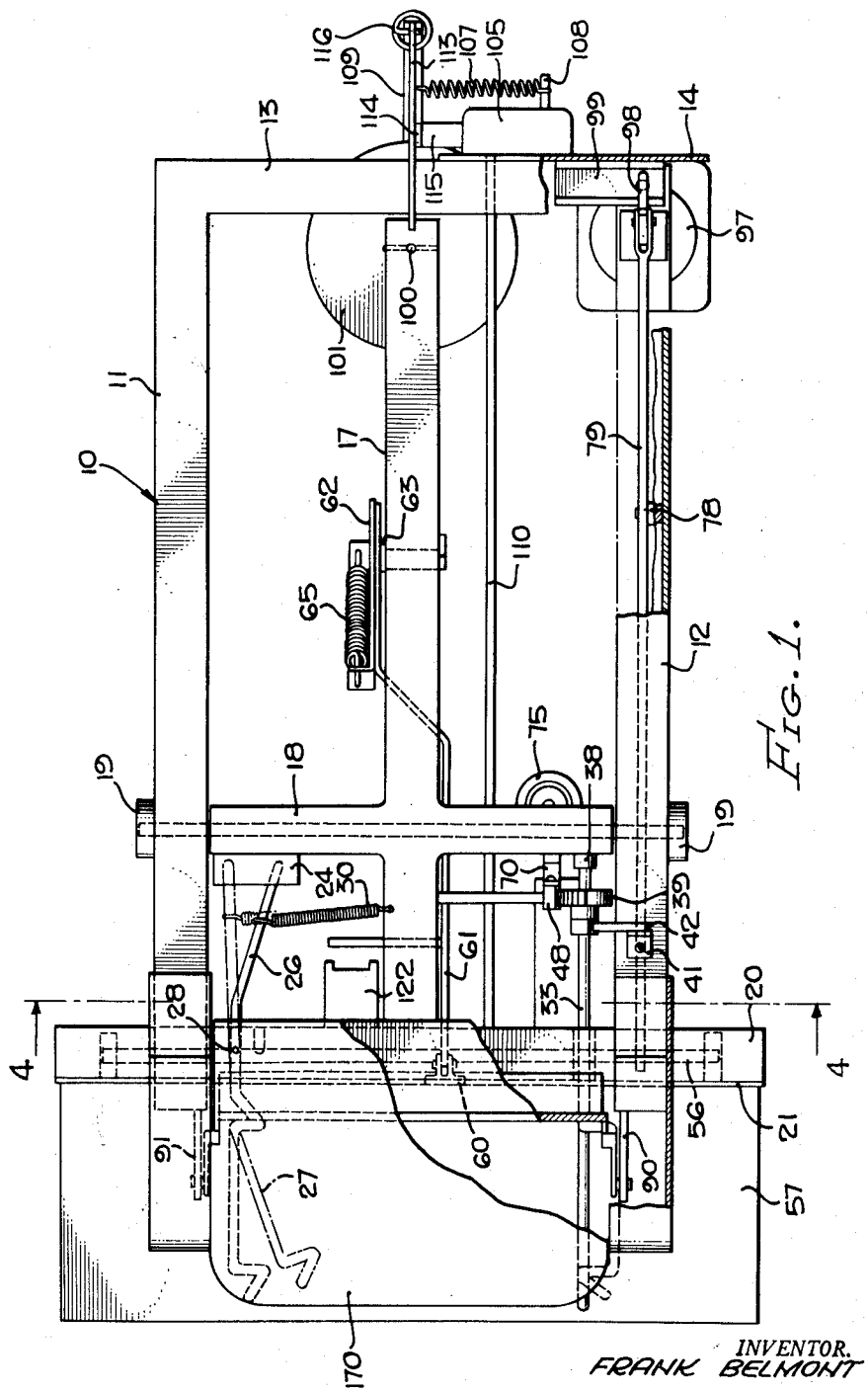
Figure 1 is a plan view partly in section of a device embodying the present invention.

Referring now more particularly to the drawings, the invention is shown as comprising a frame 10 having longitudinally extending side members 11 and 12, a rear crossbar 13, an end plate 14 and two upwardly extending hollow rectangular posts 15 and 16.

A tilt beam 17 is provided to which is affixed a crosspiece 18 the ends of which are journaled upon pivots 19. The tilt beam 17 is welded or otherwise secured to a front crosspiece 20 to which is affixed a face plate 21 and a pair of upstanding legs 22 and 23.

The crosspiece 18 is provided with a block 24 which is provided at its forward side with a slot 25 forming a slide for the rear end 26 of a bag supporting arm 27. The bag supporting arm 27 is pivotally mounted as at 28 in an opening 29 in the crosspiece 20 and face plate 21.

A coil spring 30 is provided having one end fastened to the rear end 26 of the arm 27 and the other end fastened to the tilt beam 17, as shown in Figure 1.

The face plate 21 and crosspiece 20 are provided with an opening 32 through which extends a second bag supporting arm 33. Each of the bag supporting arms 27 and 33 is bent outwardly as at 34, extends longitudinally thereafter as at 35, is then bent inwardly as at 36 and again outwardly as at 37 forming a V. The inner end of the arm 33 is journaled in a pivot 38 carried by the crosspiece 18 and mounts intermediate its ends a pinion 39 and a notched collar 40. A bracket 41 is mounted upon the side member 12 and a dogging member 42 is pivoted thereon with its inner end adapted to engage in the notch of the collar 40 to prevent rotation of the arm 33.

A crosspiece 44 is provided between the legs 22 and 23 and a supporting bar 45 extends rearwardly therefrom upon which is mounted a post 46. The post 46, at the top thereof, is provided with a slotted member 43 which forms a guide for the rod 47. The rod 47 has a rack 48 formed on the upper end thereof adapted to engage the pinion 39. A post 50 is carried by the tilt beam 17 and extends transversely thereof and at its outer or free end is provided with a channel 51 forming an upper guide for the rack 48. A stop 52 is carried by the post 46 and a pin 53 is provided on the rod 47.

A pair of bearing members 54 and 55 are provided upon the legs 22 and 23 and a shaft 56 is journaled therein. A pan 57 is provided extending downwardly from the shaft 56 and is affixed to the shaft 56 as shown. The shaft 56 also carries a rearwardly extending arm 58 affixed rigidly thereto and the inner end of the arm 58 is provided with a notch 59 adapted to engage the pin 53.

The pan 57 is provided with a bracket 60 which pivotally mounts a link 61. The link 61 has its rearward end pivotally connected to a link 62. A downwardly extending post 63 is carried by the tilt arm 17 and pivotally mounts the link 62 as at 64. To the upper end of the link 62 there is attached a coil spring 65 the end of which is affixed in a bore in the end of adjusting screw 66. Adjusting screw 66 is received in a threaded collar 67 carried by an arm 68 extending laterally from the lower end of the post 63.

The assembly just described constitutes an overcenter spring mechanism.

The rod 47 has affixed thereto bracket 70 having a member 71 which is apertured to receive a shaft 72 secured thereto by a lock nut 73 and an adjusting nut 74. The shaft 72 is operatively connected to a vacuum retarder 75 mounted by the post 76 on the tilt arm 17. The vacuum retarder 75 operates to slow the downward movement of the rod 47 for the purpose hereinafter described.

Depending from the frame member 12 is a post 78 which pivotally mounts a gate operating lever 79. The forward end of the gate operating lever 79 is provided with a curved slide 80 which receives the pin 81 carried between the bifurcated lower end of a gate operating rod 82. The gate operating rod 82 extends upwardly in the hollow post 15. The post 15 is provided on its forward edge with a slot 83 and an arm 84 affixed to the rod 82 extends through slot 83 and has a curved slide 85 formed thereon adapted to receive the pin 86 carried by the side arm 87 of the gate 88. The gate 88 is provided with two side arms 87 and 89 which are pivoted respectively from the extensions 90 and 91 of posts 15 and 16 respectively.

A rod 93 is journaled between the posts 15 and 16 and affixed thereto is a main gate 94.

The rearward end of the gate operating lever 79 is pivotally connected to a link 96. The link 96 is operated by a solenoid 97 which raises and lowers the rear end of the lever 79. Lever 79 has an extension 98 adapted to actuate a holding switch 99 when the rear end of the lever 79 is moved in a clockwise direction (Figure 2) by the solenoid 97.

The beam 17 carries a rod 100 operably connected to a dashpot 101 to prevent surging.

A microswitch 105 is pivotally mounted as by a pin 106 on the plate 14 and a tension spring 107 has one end connected to a pin 108 on the microswitch and on the other end to a frame extension 109. A rod 110 extends through the face plate 21 and has an adjusting knob 111 thereon. The other end of the rod 110 extends through the rear plate 14 and carries a cam 112 upon which rests the lower side of the microswitch 105. The tilt beam 17 has an extension 113 from which depends an L-shaped member 114 adapted to have its leg 115 extend beneath the microswitch 105. A coil spring 116 is affixed to the rear end of the extension 113 and to the extension 109 by an adjusting screw 117. By means of turning the adjusting knob 111, the shaft 110 may be rotated thus turning the cam 112 and raising or lowering the microswitch 105.

The lever 79 has an upwardly extending member 120 affixed thereto near the forward end which has a portion 121 adapted to engage the pivoted dogging member 42 and release the same from the notch in the collar 40 upon actuation of the lever 79.

A microswitch 122 is provided operably associated with the pan 57 and adapted to be opened on raising of the pan 57 by any suitable mechanism, not shown.

Referring now more particularly to Figure 6 there is illustrated a wiring diagram. The switch 122 is normally closed while the switches 105 and 99 are normally open. Conduits 125 and 126 are connected to any suitable source of power and energize the solenoid 97 through the switches 105, 99 and 122 when desired.

The switch 99 is a holding switch. As the raising of the tilt arm 17 to a horizontal position would open the switch 105 and break the circuit to the solenoid 97, the switch 99 is employed which is closed when the solenoid 97 is energized by means of the extension 98 of the lever 79, thus the return of the beam is prevented from breaking the circuit to the solenoid. However, as the switch 122 is operated by raising of the pan 57, such raising of the pan will open the switch 122 and permit the gates to open.

A hood 170 may be provided which serves to protect the mechanism and also as a guide for articles being packaged.

The device above-described is designed for use in a packing house having a chute or runway 150 upon which are discharged items to be packed such as citrus fruit, apples, etc. The chute 150 is tilted to cause the objects to travel to the left (Figure 2) and bear against the gate 94 when it is closed.

The operation of the above-described device is as follows:

Assuming the gate 94 is closed, and articles such as oranges are on the chute 150, the operator first places the open mouth of a bag 160 on the arms 27 and 35 which will be in the position shown in Figure 2 in full lines, i. e., the arm 35 will be in its downward position. If an elastic closure fruit bag such as shown in copending application, Frank Belmont, Serial No. 104,970, now Patent No. 2,585,214, is used, the elastic will hold the bag tightly in the notch formed by the portions 36 and 37 and on the portions 34.

After the bag has been placed in position, the operator raises the pan 57 to the position shown in Figure 2. This raising of the pan 57 brings the arm 58 into contact with the pin 53 forcing the rod 47 carrying the rack 48 downwardly, thus rotating the pinion 39 and the arm 33 to its horizontal position as shown in Figure 5.

The raising of the pan 57 at the same time opens the switch 122 thus breaking the circuit to the solenoid 97. The breaking of the circuit to the solenoid 97 permits the gate 94 under the pressure of the fruit to bear sufficiently against the gate 88 to cause the gates to open and fall into the position shown in Figure 2, wherein the gate 94 forms a delivery for the fruit into the bag 160. The raising of the pan 57 and the consequent rotation of the arm 33 into the horizontal position permits the dogging member 42 to engage in the notch of the collar 40 and thus prevent rotation of the arm 33 during filling. As the bag continues to fill, the pan 57 may be progressively depressed from the position shown in Figure 2 in phantom to the position shown in full lines. In so doing, the pan forces the overcenter mechanism formed by the links 61 and 62 overcenter. As the bag is then completely supported from the arms 27 and 33, which are themselves carried by the tilt beam 17, the tilt beam 17 will be pivoted counterclockwise (Figure 2) about the pivots 19 against the force of the coil spring 116. Upon reaching a predetermined position, which is determined by the positioning of the microswitch 105 by means of the knob 111 turning the cam 112, the arm 115 activates the switch 105 thus energizing the solenoid 97 turning the lever 79 in a clockwise direction, thus raising the arm 82 and closing the gates. As the gates close, the gate 94 pivots in a clockwise position (Figure 2), while the gate 88 pivots in a counterclockwise position. In a fully closed position, the gate 88 has a portion extending above the upper portion of the gate 94. This closing of the gates forces back any fruit attempting to spill out and overfill the bag.

As the lever 79 is rotated to close the gates, it also brings the member 121 into engagement with the dogging member 42 and frees the dogging member from the notch of the collar 40. The arm 33 is thus in position to be rotated under the force of the weight of the fruit into its downwardly extending position. In order, however, to prevent too rapid rotation of the arm 33, which might effect release of the bag prior to complete filling, the downward movement of the rod 47 is slowed by means of the vacuum retarder 75. As the arm 33 is rotated to its vertical position, the bag 160 is released and if a bag of the elastic closure type is used it may merely be permitted to fall to a suitable conveying mechanism disposed beneath the arm 33. In this condition the device is now prepared for the subsequent operation.

Referring now more particularly to Figures 7 and 8, there is illustrated therein a simplified embodiment of the gate operating mechanism. This simplified embodiment operates through the same circuits and in the same manner as the previous embodiment and similar structure has been given similar numerals. It will be appreciated that the portions of the device not illustrated are the same in the two embodiments.

In this embodiment the frame is provided with a crosspiece or transverse extension 13a to which, in this case, the post 78 is affixed. It will be noted that in the change from the embodiment shown in Figures 1–6 to the embodiment shown in Figures 7 and 8, the post 78 and consequently the solenoid 97 and its associated mechanism have been moved from the righthand side of the device to the lefthand side.

As before, the post 78 pivotally mounts a gate operating lever designated as 79a. The forward end of the gate operating lever 79a is bifurcated and receives a pin 81a which pivotally mounts link 130. The link 130 is pivotally connected at its upper end to a bracket 131 which bracket is affixed to the outer edge of a gate 88a. The gate 88a is pivotally mounted by being affixed to a shaft 89a journaled in the upright posts 15a (not shown) and 16a. The posts 15a and 16a are similar to the posts 15 and 16 in the previous embodiment but in this case no longer need be hollow posts. The other end of the operating lever 79a, as before, is pivotally connected to a link 96 which is operated by the solenoid 97.

It will be appreciated that in this embodiment only one gate is provided and hence the main gate 94 is dispensed with.

The operation of the above-identified device is deemed clear from the drawing and is in all respects similar to the operation of the previous embodiment.

The actuation of the solenoid 97 serves to give the gate operating lever 79a a clockwise rotation which moves the gate from the position shown in full in Figure 8 to that shown in phantom or further into completely closed position. It will be noted that as the gate closes it rotates in a clockwise manner so as to push backward on to the belt any fruit tending to pass into the bags.

While there has been described what are at present considered preferred embodiments of the present invention, it will be appreciated by those skilled in the art that various changes and modifications can be made therein without departing from the essence of the invention and it is intended to cover herein all such changes and modifications as come within the true spirit and scope of the appended claims.

I claim:

1. A packaging machine for handling articles such as citrus fruit, apples, potatoes and the like comprising: a frame; a beam pivoted on said frame; a pair of spaced arms carried by said beam; said arms being shaped to form bag retaining members; one of said arms being pivotally mounted for turning movement to bag releasing position; a pan pivotally mounted on said beam for movement into and out of position underlying said arms for supporting from the bottom a bag retained by said arms, said pan being adapted to pivot in a direction to lower its area of support upon progressive filling of the bag; a gate operable to control flow of said articles through said machine; means responsive to a predetermined weight of said articles carried by said arms to close said gate; and means operable to restrain turning movement of said pivotally mounted arm until said predetermined weight is carried by said arms.

2. A packaging machine for handling articles such as citrus fruit, apples, potatoes and the like comprising: a frame; a beam pivoted on said frame; a pair of spaced arms carried by said beam; sid arms being shaped to form bag retaining members; one of said arms being pivotally mounted for turning movement to bag releasing position; a pan pivotally mounted on said beam for movement into and out of position underlying said arms and adapted to support from the bottom a bag retained by said arms; a gate operable to control flow of said articles through said machine; means responsive to a predetermined weight of said articles carried by said arms to close said gate; means operable to restrain turning movement of said pivotally mounted arm until said predetermined weight is carried by said arms; and means connecting said pan and said pivotally mounted arm for turning said arm to bag retaining position on movement of said pan into position underlying said arms.

3. A packaging machine for handling articles such as citrus fruit, apples, potatoes and the like comprising: a frame; a beam pivoted on said frame; a pair of spaced arms carried by said beam; said arms being shaped to form bag retaining members; one of said arms being pivotally mounted for turning movement to bag releasing position; the other of said arms being mounted for movement towards and away from said pivotally mounted arm; resilient means biasing said other arm away from said pivotally mounted arm; a pan pivotally mounted on said beam for movement into and out of position underlying said arms for supporting from the bottom a bag retained by said arms, said pan being adapted to pivot in a direction to lower its area of support upon progressive filling of the bag; a gate operable to control flow of said articles through said machine; means responsive to a predetermined weight of said articles carried by said arms to close said gate; and means operable to restrain turning movement of said pivotally mounted arm until said predetermined weight is carried by said arms.

4. A packaging machine for handling articles such as citrus fruit, apples, potatoes and the like comprising: a frame; a beam pivoted on said frame; a pair of spaced arms carried by said beam; said arms being shaped to form bag retaining members; one of said arms being pivotally mounted for turning movement to bag releasing position; the other of said arms being mounted for movement towards and away from said pivotally mounted arm; resilient means biasing said other arm away from said pivotally mounted arm; a pan pivotally mounted on said beam for movement into and out of position underlying said arms and adapted to support from the bottom a bag retained by said arms; a gate operable to control flow of said articles through said machine; means responsive to a predetermined weight of said articles carried by said arms to close said gate; means operable to restrain turning movement of said pivotally mounted arm until said predetermined weight is carried by said arms; and means connecting said pan and said pivotally mounted arm for turning said arm to bag retaining position on movement of said pan into position underlying said arms.

5. A packaging machine for handling articles such as citrus fruit, apples, potatoes and the like comprising: a frame; a beam pivoted on said frame; a pair of spaced arms carried by said beam; said arms being shaped to form bag retaining members; one of said arms being pivotally mounted for turning movement to bag releasing position; a pan pivotally mounted on said beam for movement into and out of position underlying said arms and adapted to support from the bottom a bag retained by said arms; a gate operable to control flow of said articles through said machine; means responsive to a predetermined weight of said articles carried by said arms to close said gate; means operable to restrain turning movement of said pivotally mounted arm until said predetermined weight is carried by said arms; and resilient means biasing said pan towards said underlying position during the major portion of each packaging operation; said pan being adapted to pivot in a direction away from said underlying position upon progressive filling of the bag.

6. A packaging machine for handling articles such as citrus fruit, apples, potatoes and the like comprising: a frame; a beam pivoted on said frame; a pair of spaced arms carried by said beam; said arms being shaped to form bag retaining members; one of said arms being pivotally mounted for turning movement to bag releasing position; a pan pivotally mounted on said beam for movement into and out of position underlying said arms and adapted to support from the bottom a bag retained by said arm; a gate operable to control flow of said articles through said machine; means responsive to a predetermined weight of said articles carried by said arms to close said gate; means operable to restrain turning movement of said pivotally mounted arm until said predetermined weight is carried by said arms; means connecting said pan and said pivotally mounted arm for turning said arm to bag retaining position on movement of said pan into position underlying said arms; and resilient means biasing said pan towards said underlying position during the major portion of each packaging operation; said pan being adapted to pivot in a direction away from said underlying position upon progressive filling of the bag.

7. A packaging machine for handling articles such as citrus fruit, apples, potatoes and the like comprising: a frame; a beam pivoted on the frame; a pair of spaced arms carried by said beam; said arms being shaped to form bag retaining members; the first of said arms being pivotally mounted for turning movement to bag releasing position; the second of said arms being pivotally mounted intermediate its ends for movement of the free end thereof towards and away from said first arm; resilient means biasing said free end away from said first arm; a gate mounted on said frame and operable to control flow of said articles through said machine; linkage means associated with said gate; a solenoid for actuating said linkage means to close said gate; a switch for controlling said solenoid; means carried by said beam for engaging said switch when a predetermined weight of said articles is carried by said arms; and dogging means operable to restrain turning movement of said first arm until said predetermined weight is carried by said arms.

8. A packaging machine for handling articles such as citrus fruit, apples, potatoes and the like comprising: a frame; a beam pivoted on the frame; a pair of spaced arms carried by said beam; said arms being shaped to form bag retaining members; the first of said arms being pivotally mounted for turning movement to bag releasing position; the second of said arms being pivotally mounted intermediate its ends for movement of the free end thereof towards and away from said first arm; resilient means biasing said free end away from said first arm; a gate mounted on said frame and operable to control flow of said articles through said machine; linkage means associated with said gate; a solenoid for actuating said linkage means to close said gate; a switch for controlling said solenoid; means carried by said beam for engaging said switch when a predetermined weight of said articles is carried by said arms; dogging means operable to restrain turning movement of said first arm until said predetermined weight is carried by said arms; and means carried by said linkage and operable on actuation of said linkage to disengage said dogging means.

9. A packaging machine for handling articles such as citrus fruit, apples, potatoes and the like comprising: a frame; a beam pivoted on the frame; a pair of spaced arms carried by said beam; said arms being shaped to form bag retaining members; the first of said arms being pivotally mounted for turning movement to bag releasing position; the second of said arms being pivotally mounted intermediate its ends for movement of the free end thereof towards and away from said first arm; resilient means biasing said free end away from said first arm; a pan pivotally mounted on said beam for movement into and out of position underlying said arms and adapted to support from the bottom a bag retained by said arms; a gate mounted on said frame and operable to control flow of said articles through said machine; linkage means associated with said gate; a solenoid for actuating said linkage means to close said gate; a switch for controlling said solenoid; means carried by said beam for engaging said switch when a predetermined weight of said articles is carried by said arms; dogging means operable to restrain turning movement of said first arm until said predetermined weight is carried by said arms; means carried by said linkage and operable on actuation of said linkage to disengage said dogging means; and means connecting said pan and said first arm for turning said arm to bag retaining position on movement of said pan into position underlying said arms.

10. A packaging machine for handling articles such as citrus fruit, apples, potatoes and the like comprising: a frame; a beam pivoted on the frame; a pair of spaced arms carried by said beam; said arms being shaped to form bag retaining members; the first of said arms being pivotally mounted for turning movement to bag releasing position; the second of said arms being pivotally mounted intermediate its ends for movement of the free end thereof towards and away from said first arm; resilient means biasing said free end away from said first arm; a pan pivotally mounted on said beam for movement into and out of position underlying said arms for supporting from the bottom a bag retained by said arms, said pan being adapted to pivot in a direction to lower its area of support upon progressive filling of the bag; a gate mounted on said frame and operable to control flow of said articles through said machine; linkage means associated with said gate; a solenoid for actuating said linkage means to close said gate; a switch for controlling said solenoid; means carried by said beam for engaging said switch when a predetermined weight of said articles is carried by said arms; dogging means operable to restrain turning movement of said first arm until said predetermined weight is carried by said arms; means carried by said linkage and operable on actuation of said linkage to disengage said dogging means; means connecting said pan and said first arm for turning said arm to bag retaining position on movement of said pan into position underlying said arms; and a second switch associated with said pan for breaking the circuit to said solenoid to open said gate when said pan is moved to said underlying position.

11. A packaging machine for handling articles such as citrus fruit, apples, potatoes and the like comprising: a frame; a beam pivoted on said frame; a pair of spaced arms carried by said beam; said arms being shaped to form bag retaining members; one of said arms being pivotally mounted for turning movement to bag releasing position; a pan pivotally mounted on said beam for movement into and out of position underlying said arms and adapted to support from the bottom a bag retained by said arms; a gate operable to control flow of said articles through said machine; means responsive to a predetermined weight of said articles carried by said arms to close said gate; means operable to restrain turning movement of said pivotally mounted arm until said predetermined weight is carried by said arms; and resilient means biasing said pan towards said underlying position during the major portion of each packaging operation; said pan being adapted to pivot in a direction away from said underlying position upon progressive filling of the bag; the weight of said resilient means being less than said predetermined weight.

12. A packaging machine for handling articles such as citrus fruit, apples, potatoes and the like comprising a frame; a beam pivoted on the frame; a pair of spaced arms carried by said beams; said arms being shaped to form bag retaining members; the first of said arms being pivotally mounted for turning movement to bag releasing position; the second of said arms being pivotally mounted intermediate its ends for movement of the free end thereof towards and away from said first arm; resilient means biasing said free end away from said first arm for supporting from the bottom a bag retained by said arms; a pan pivotally mounted on said beam for movement into and out of position underlying said arms; said pan being adapted to pivot in a direction to lower its area of support upon progressive filling of the bag; a gate mounted on said frame and operable to control flow of said articles through said machine; linkage means associated with said gate; a solenoid for actuating said linkage means to close said gate; a switch for controlling said solenoid; means carried by said beam for engaging said switch when a predetermined weight of said articles is carried by said arms; and dogging means operable to restrain turning movement of said first arm until said predetermined weight is carried by said arms; and means operably connected to said pan for disengagement of said dogging means upon movement of the pan out of the position underlying said arms.

FRANK BELMONT.

References Cited in the file of this patent

UNITED STATES PATENTS

| Number | Name | Date |
|---|---|---|
| 984,537 | Buschman | Feb. 21, 1911 |
| 992,513 | McAnulty | May 16, 1911 |
| 1,419,627 | Hartman | June 13, 1922 |
| 1,701,830 | Ward | Feb. 12, 1929 |
| 1,777,227 | Roth | Sept. 30, 1930 |
| 1,795,265 | Rice | Mar. 3, 1931 |
| 2,031,708 | Hannewald | Feb. 25, 1936 |
| 2,116,934 | Rapp | May 10, 1938 |
| 2,327,367 | Nowak | Aug. 24, 1943 |
| 2,373,649 | Broome | Apr. 17, 1945 |
| 2,603,443 | Miller | July 15, 1952 |